June 19, 1928.                                                                    1,674,271
R. A. WINQUIST
PEELING AND CORING KNIFE
Filed July 6, 1926
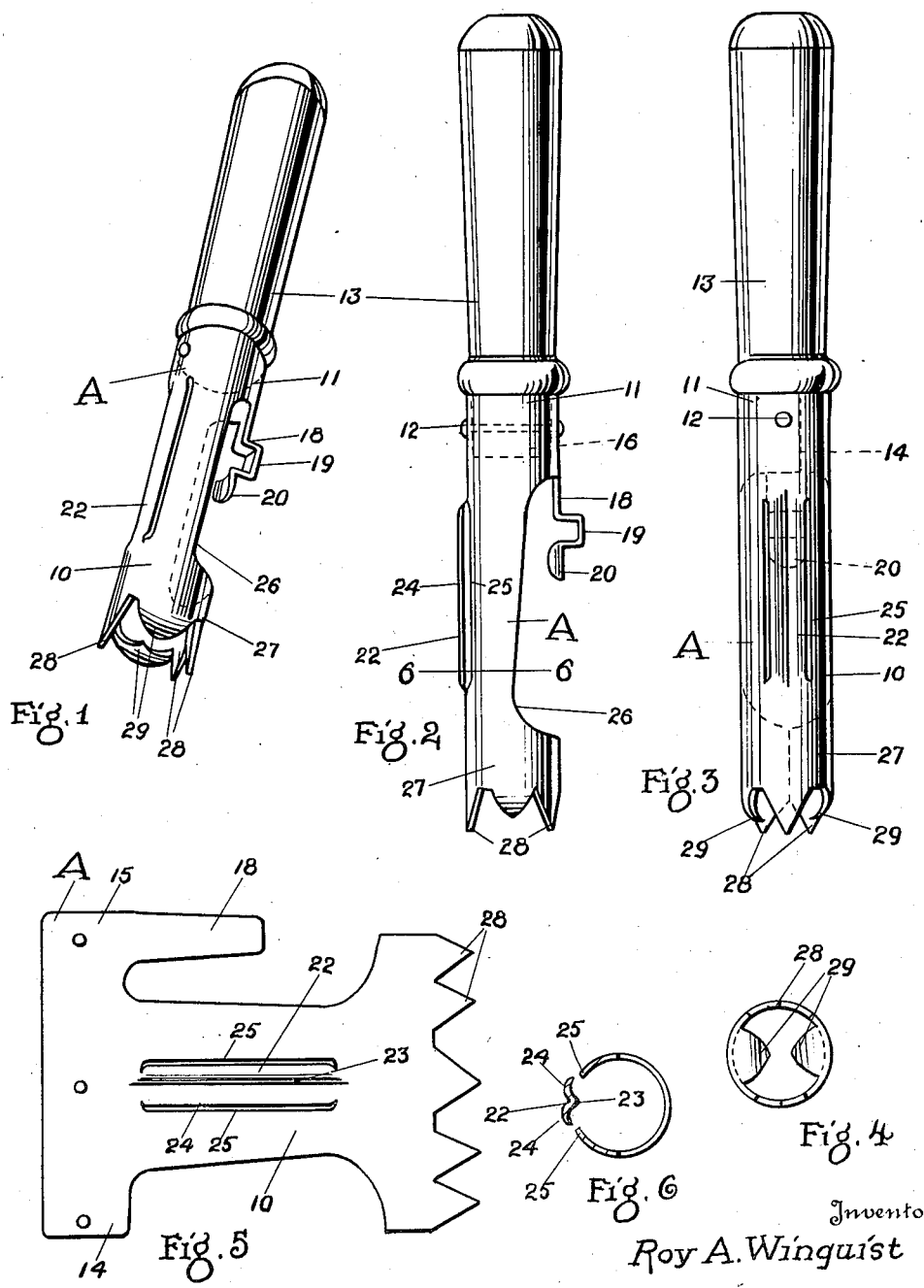
Inventor
Roy A. Winquist
By Honor Fische
Attorney Patented June 19, 1928.

1,674,271

UNITED STATES PATENT OFFICE.

ROY A. WINQUIST, OF ST. PAUL, MINNESOTA.

PEELING AND CORING KNIFE.

Application filed July 6, 1926. Serial No. 120,658.

My invention relates to a peeling and coring knife such as is adapted to be used in peeling fruit and vegetables. A particular object of the invention resides in means designed to provide a blade member which may be used to peel oranges or may be used for cutting what is known as shoestring potatoes.

A feature of my invention resides in a cutting member made of a single piece of material having a cylindrical or tubular like body portion which is stamped out of sheet metal or other suitable material and is designed with a longitudinally extending blade having parallelly cutting edges on either side of the same, while a central rib like portion is formed through the blade, which depends inwardly providing a means for positioning the cutting edges of the blade in proper relation to the guard portion formed by the cylindrical body on either side of the blade.

My invention also includes coring and cutting knives, together with a peculiar design and construction adapted to provide shoulder members which hold the core of the fruit in the cutter, and a tubular member so that the core can be readily removed without sliding too freely out of the corer. This is an important feature of my invention as it permits the core to be more readily removed from the fruit. The inturned knife members used in the coring operation of my device also permit the core of the fruit to be bored out, so to speak, and to leave a slight portion of the fruit at the base of the cored out portion so as to form a closure for the end of the bored out portion, thus providing a hole in the core of the fruit with the bottom adapted to hold the sugar or other substance in the fruit while it is being baked. Ordinarily cutters of this nature are designed to cut directly through the fruit, while my device is preferably used to cut almost through, leaving a closure at the bottom of the cut.

Another object of the invention is to provide a curved outer end on the short blade used for peeling oranges and for cutting shoestring potatoes, so that the outer end of the blade may act as a guide over the fruit or vegetable being cut and to prevent biting in of the blade in use. This is particularly true when the blade is used as a means of cutting shoestring potatoes, as the inturned edges of the blade, which project from the end of the same, form a guide or gauge to prevent the shoestring cutter from penetrating too deeply into the body of the potato or other vegetable. The simplicity of the construction of my peeler and corer provides a device which is very desirable and which can be manufactured economically.

These features, together with other details and objects of the invention will be more fully and clearly set forth in the specification and claims as follows:

Figure 1 is a perspective view of my peeling and coring knife with the operating handle.

Figure 2 is a side elevation of the same.

Figure 3 is another side elevation from a different position.

Figure 4 is an end view showing the shoulder knives of the coring knife end.

Figure 5 is a geometrical development of the blank formation of my peeling and coring knife as it would appear blanked out from sheet material.

Figure 6 is a section on the line 6—6 of Figure 2 in direction of the arrow.

In the drawings my peeling and coring knife A is formed of sheet material of any desired nature and thickness so as to provide the most desirable construction. I prefer to provide the same of simple construction blanked from a single sheet of metal, as illustrated in the formation shown in Figure 5.

My peeling and coring knife A is adapted to be formed with a cylindrical body portion 10 after the same has been blanked out of sheet material and is provided with a collar portion 11 on one end, which is adapted to be attached by the pin 12 to the handle 13. The handle 13 may be of wood or any other suitable material. The collar portion 11 of my cutting knife is cylindrical in shape and is provided with a tongue portion 14 which overlaps the portion 15 in a manner so that a complete circular collar is adapted to extend about the shank portion 16 of the handle 13. The pin 12 may extend through the portions 14 and 15 and is adapted to clamp the collar firmly to the handle shank 16. This provides a very rigid and substantial means of supporting the cutter and peeler A to the handle 13.

Adjacent and extending integrally from the collar portion 11 I provide an outwardly extending cutting blade 18, which is formed with a channel shaped portion 19, from which extends the guide tongue 20. This cutting blade 18 is adapted to provide a blade for cutting vegetables in what is known as shoestring type of potatoes and other vegetables cut in long narrow ribbon like formation, the form and shape of the cut being of a nature to conform with the channel shape 19 of the blade 18. The outer free end 20 of the blade 18 is curved inwardly as illustrated in Figure 1, so that the side edges of the blade 20 do not bite into the vegetable, but permit the tongue 20 to act as a stop or gauge for limiting the depth of the cut by the channel portion 19 of the blade 18. This blade 18 is used depending downwardly in a manner so as to project to cut into the vegetable held in the hand or otherwise.

The blade 18 forms a suitable cutter for cutting vegetables in a string like nature or it may be used to peel oranges and cutting out a portion of the skin without cutting into the body of the fruit, thus permitting the remainder of the skin to be readily removed. Other uses of the blade 18 with the channel cut by the formation 19 are apparent.

My cutter A is provided with a longitudinally extending blade 22, which is formed by cutting out a portion of the body 10 of the cutter A. This blade 22 is formed with a central longitudinally extending reinforcing rib 23, which extends inwardly as illustrated in Figure 6 and is adapted to so form the blade 23 as to cause the outer cutting edges 24 to project upwardly from the edges 25 along the body of the cutter A. The rib 23 not only stiffens the blade 22 but also reinforces it in a manner to provide a very desirable shape so that the space between the edges 24 and 25, which extend parallel, is at all times practically equalized and the peeler A may be used to permit the peel to slide through the opening or slot formed between the edges 24 and 25.

The body 10 of the peeler A is cut away at 26 to form a recess along one side of the same and in a position practically diametrically opposite to the blade 22. This recess 26 forms an opening through which the peel cut by the blade 22 may be discharged from the peeler A as the same is in operation or to permit the slicing of vegetables and other articles, permitting the slices to drop out freely from the recess 26. It is also apparent that the blade 18 extends in vertical and central position in relation to the recess 26 which extends along one side of the peeler A.

I provide coring blades 28 projecting from the collar like end portion 27. These blades are of a pointed nature and extend from the collar end of the peeler A and these cutting blades are adapted to cut freely into the fruit so as to provide a suitable means of coring the same.

I have found it desirable to bend one or more of the cutting blades 28 to form the inwardly projecting shoulder blade members 29 as illustrated in Figures 1, 3 and 4. These inwardly bent blades form a means of providing a shoulder so that when the core of the fruit is cut in a manner so as to extend into the cylindrical body 10 of the peeler and cutter A, upon withdrawing the same from the fruit the core will readily remain and be held by the blades 29. By giving a rotary or boring action to the cutting and penetrating portion of the peeler and corer A, the blades 28 will cut straight into the fruit, while the blades 29 will act as shoulders and stops to hold the cut away portion or core of the fruit until the core has been withdrawn from the same. I have also found that these blades provide a suitable means for limiting the cutting of the core of the fruit so that a wall or portion of the fruit is left at the depth of the cut, which is very desirable in coring apples and other fruit of a similar nature where it is preferred to use sugar in baking the same. The undercut wall at one end of the core holds the sugar in the fruit and yet permits the core to be readily removed. Heretofore peelers and corers have been made without using my shoulder blades, in so far as I know, and it is hard to remove the core without causing the coring blades to extend completely through the fruit.

The simple inexpensive construction designed in my integral peeling and coring knife is apparent and it is obvious that the same may be made of any suitable metal which will retain its form and shape together with the proper cutting edges for the blades, so that a very suitable and useful household utility is provided in my device.

The reinforcing of the blade 22 is of importance as it permits slicing or peeling by the blade without materially affecting the shape under ordinary use, holding the cutting edges up in operative position and permitting clearance of the cut away portion of the body A. The channel shaped cutter 18 provides a means associated with the body of the cutter A which is very desirable for making channel cuts and without biting into the vegetable or fruit by reason of the stop or shoulder formed by the tongue 20.

In accordance with the patent statutes I have described the principles of operation of my peeling and coring knife, together with a means of cutting vegetables into a shoestring or ribbon like nature, and while the drawings illustrate a particular formation and design, I desire to have it understood that the same is only suggestive of a means of carrying out my invention and that other forms and designs may be used without departing from the spirit of the invention and within the scope of the following claims.

I claim:

1. A peeling and cutting knife having a tubular body formation, a handle for supporting said knife, collar ends formed on said knife, a longitudinal blade extending along one side of said body portion, a recess oppositely disposed to provide a cut away portion in said knife, an offset cutting tongue extending in said recess, and coring knives having stop and shoulder portions associated with said coring knives.

2. A peeling, coring and string like cutter including, a tubular body portion, collar ends formed thereon, a recess on one side thereof, a string cutter blade extending into said recess, a peeling blade having a double side and a reinforcing longitudinal rib formed therein, and coring and lifting blades formed on the collar like outer end of said cutter.

ROY A. WINQUIST.